(12) United States Patent
Zhaksilikov et al.

(10) Patent No.: US 7,503,019 B2
(45) Date of Patent: Mar. 10, 2009

(54) POINT AND CLICK EXPRESSION BUILDER

(75) Inventors: Marat Zhaksilikov, Snohomish, WA (US); Kenneth Y. Ogami, Bothell, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 195 days.

(21) Appl. No.: 11/512,545

(22) Filed: Aug. 29, 2006

(65) Prior Publication Data
US 2007/0130548 A1  Jun. 7, 2007

Related U.S. Application Data

(60) Provisional application No. 60/741,948, filed on Dec. 1, 2005.

(51) Int. Cl.
*G06F 17/50* (2006.01)
(52) U.S. Cl. .............................. 716/1; 716/3
(58) Field of Classification Search ............ 716/1, 716/2, 3
See application file for complete search history.

(56) References Cited

U.S. PATENT DOCUMENTS

2006/0259885 A1 * 11/2006 Mortensen et al. ............ 716/7
2007/0050710 A1 * 3/2007 Redekop ..................... 715/523

OTHER PUBLICATIONS

Cypress, Application Note, "PSoC Express™ Primer: First Introduction," AN2261, Revision A, Mar. 15, 2005, pp. 1-19.
Cypress Microsystems, Application Note, "Global Resources in PSoC™ Designer," AN2221, Revision A, Oct. 15, 2004, pp. 1-6.
Cypress Perform, PSoC Designer™, IDE User Guide, Document # 38-12002 Rev. E, 2002-2005, pp. 2-160.

* cited by examiner

*Primary Examiner*—Vuthe Siek
*Assistant Examiner*—Magid Y Dimyan
(74) *Attorney, Agent, or Firm*—Blakely, Sokoloff, Taylor & Zafman LLP

(57) ABSTRACT

In one embodiment, a method for constructing an application includes presenting to a user a list of possible elements for a logic expression. The possible elements may include one or more names of variables. The method further includes receiving a user selection of one or more elements from the list of possible elements, presenting the selected elements as part of the logic expression, and allowing the user to complete the logic expression using the selected elements and at least one logical operator.

19 Claims, 15 Drawing Sheets

POINT AND CLICK EXPRESSION BUILDER

CROSS-REFERENCE TO RELATED APPLICATIONS

This application claims the benefit of U.S. Provisional Application No. 60/741,948, filed Dec. 1, 2005, and incorporated herein by reference in its entirety.

BACKGROUND

1. Field

Embodiments of the invention relate generally to application development and more specifically, but not exclusively, to tools for building logic expressions.

2. Background Information

Embedded system design tools assist users in the creation of applications to be programmed into processing devices such as microcontrollers. One existing embedded system design tool allows a system designer to create an embedded application by combining system input and output (I/O) devices such as LEDs, switches, sensors and fans. The embedded system design tool uses I/O device drivers that represent I/O devices to a user. This tool also assists users in building logic expressions that define the behavior of the embedded application. However, this assistance is limited since it requires users to type valid names of logic expression components (e.g., valid driver state names) while constructing the logic expressions. Hence, the existing process for constructing logic expressions is error prone and inefficient because it requires the user to memorize the names of logic expression components.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

In the following description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring understanding of this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the following description and claims, the term "coupled" and its derivatives may be used. "Coupled" may mean that two or more elements are in direct contact (physically, electrically, magnetically, optically, etc.). "Coupled" may also mean two or more elements are not in direct contact with each other, but still cooperate or interact with each other.

Embodiments of the present invention provide an efficient and easy-to-use mechanism for generating logic expressions. This mechanism reduces errors and eliminates the necessity to memorize names of logic expression components by end users.

Figure 1:
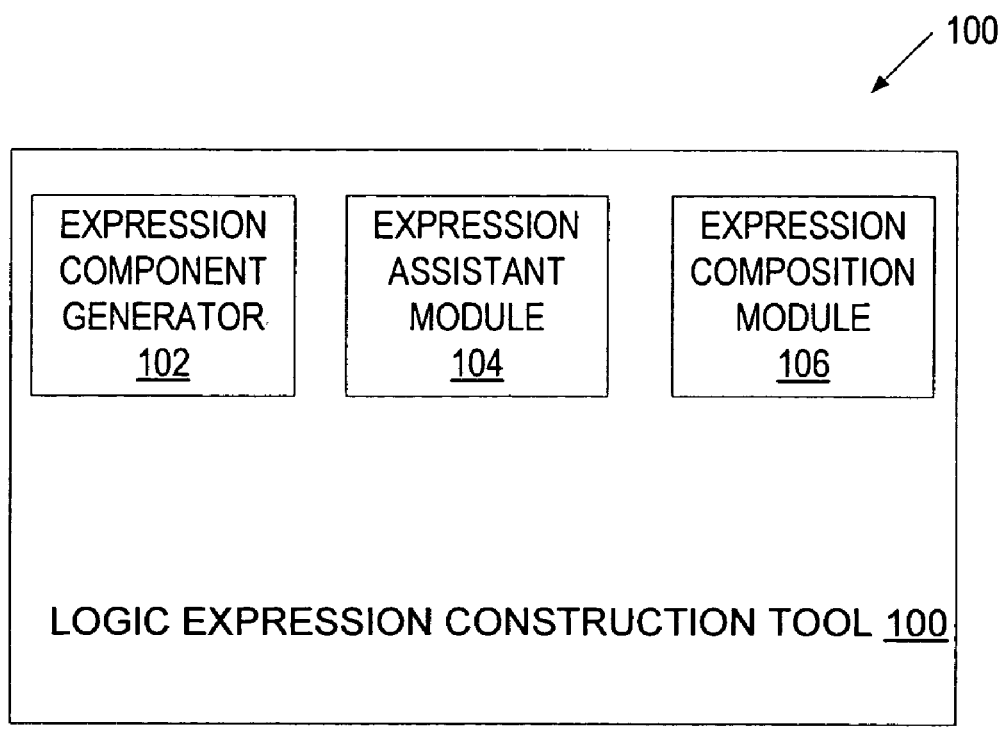
FIG. 1 is a block diagram of one embodiment of a logic expression construction tool.

FIG. 1 is a block diagram of one embodiment of a logic expression construction tool 100. The logic expression construction tool 100 includes an expression component generator 102, an expression assistant module 104, and an expression composition module 106.

The expression component generator 102 is responsible for generating a list of possible components of a logic expression. The possible components may include names of variables that may possibly be used for the logic expression, and values or value ranges that may possibly be used in the logic expression for comparison with the variables. For example, the possible components may include names of inputs and outputs of an application and names of value ranges to be used for comparison with inputs and outputs. In one embodiment, the expression component generator 102 first receives the user-specified type of logic expression and then generates a list of possible components for the logic expression of this type.

The expression assistant module 104 is responsible for presenting the list of possible logic expression components to the user and allowing the user to select one or more components from the list. The user can make the selection by, for example, clicking or double-clicking the desired component(s) from the list, copying the desired components using the copy-and-paste operation, etc. In one embodiment, the expression assistant module 104 presents the list of possible logic expression in a designated window (e.g., Expression Assistant window) on the screen that may appear automatically or upon a user request to show this window. In one embodiment, the expression assistant module 104 establishes a dynamic connection between the Expression Assistant window and a currently active Expression Editor window controlled by the expression composition module 306.

The expression composition module 106 is responsible for presenting the selected expression components as part of the logic expression. For example, the expression composition module 106 may present the selected components in a pop-up window that allows the user to edit its content. For example, the user may add logical operators to connect the selected components and add values for comparison with the selected components. In one embodiment, the expression construction module 106 provides a list of logical operators (or their symbols) selectable by the user for use in the logic expression.

Figure 2:
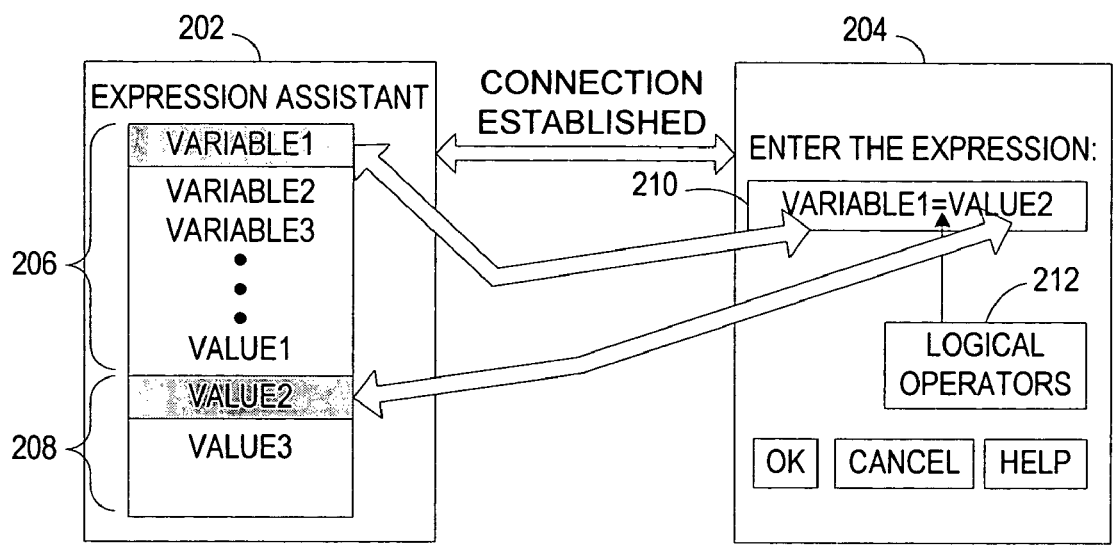
FIG. 2 illustrates the operation of the logic expression construction tool 100 according to one embodiment of the present invention.

FIG. 2 illustrates the operation of the logic expression construction tool 100 according to one embodiment of the present invention. FIG. 2 shows two windows provided on the screen by the expression construction module 106. The first window is an expression assistant window 202 that displays a list of possible expression components of a logic expression. In particular, the window 202 displays valid names of multiple variables 206 and comparison values 208.

The window 202 is connected to an expression window 204. The connection may be established using various mechanisms (e.g., the window 202 can be displayed in response to a user activating a designated button in the expression window 204). When the user selects an entry displayed in the window 202, this entry appears in the window 204 in the "Enter the expression" box 210. The entry may appear in the box 210 in response to the user's clicking or double-clicking the entry in the window 202, or in response to the user's copying the entry in the window 202 and then pasting it in the box 210. The user may then add data to the box 210 or change data displayed in the box 210. For example, the user may add a logical operator (e.g., "=") to the box 210, and then select one of values 208 presented in the window 208. The selected value will appear in the box 210, completing the displayed expression. In one embodiment, the window 204 also presents logical operator symbols (e.g., symbols of arithmetic operators, Boolean logic operators, etc.) in a list box 212 or as independent buttons. The user can select the desired logical operator (e.g., by clicking or double-clicking it) to add it to the expression displayed in the box 210.

Figure 3:
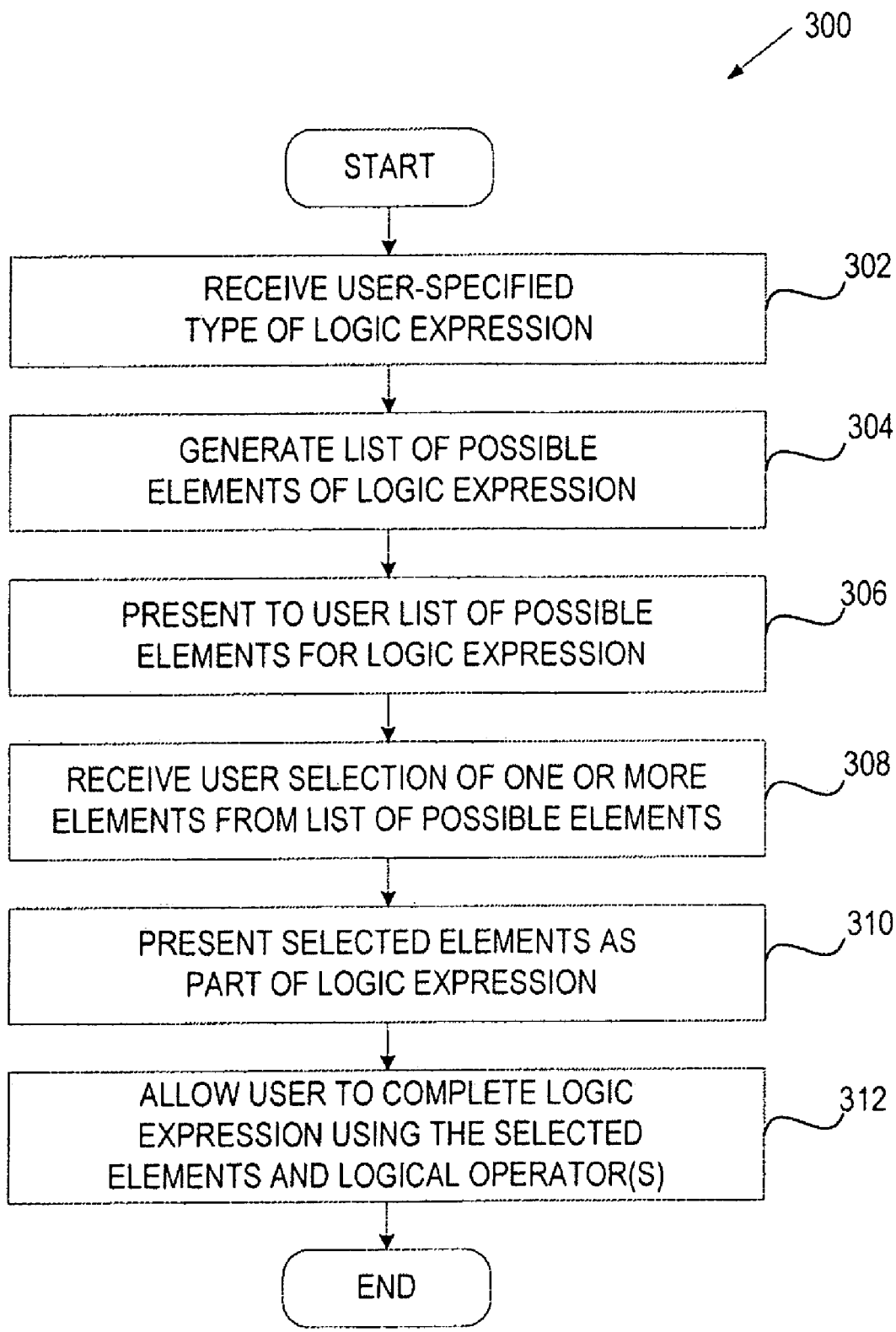
FIG. 3 is a flow diagram of one embodiment of a method for facilitating the construction of a logic expression.

FIG. 3 is a flow diagram of one embodiment of a method 300 for facilitating the construction of a logic expression. The method 300 may be performed by processing logic of the logic expression construction tool 100. Processing logic may comprise hardware (e.g., circuitry, dedicated logic, programmable logic, microcode, etc.), software (such as run on a general purpose computer system or a dedicated machine), or a combination of both.

Referring to FIG. 3, method 300 begins with processing logic receiving a user-specified name or type of a logic expression (block 302). In one embodiment, a UI is provided that allows the user to specify the name or type of the logic expression (e.g., by selecting it from a relevant list).

At block 304, processing logic generates a list of possible elements of the specified logic expression. The possible elements may include names of variables that can be used for the logic expression, and values or value ranges that can be used for comparison with the variables. For example, the possible components may include names of inputs and outputs of an application and names of value ranges to be used for comparison with inputs and outputs. Alternatively, the comparison values and/or value ranges are not included in the list.

At block 306, processing logic presents to the user the list of possible elements of the logic expression. In one embodiment, the list of possible elements is displayed in a separate window on the screen. As the names of variables are presented to the user automatically, the user does not have to have any prior knowledge of their names.

At block 308, processing logic receives the user's selection of one or more elements from the list. The user can make a selection by, for example, clicking or double-clicking the desired element(s) or copying and pasting the desired element(s) in the list. The user may be able to select several elements at once or one element at a time.

At block 310, processing logic presents the selected elements as part of the logic expression. In one embodiment, processing logic presents the selected elements in a designated window.

At block 310, processing logic allows the user to complete the logic expression using the selected elements and one or more logical operators. The selected elements may include the names of variable and comparison values. Alternatively, the selected elements include only the names of variables, and the comparison values are manually specified by the user. In one embodiment, the symbols of logical operators are presented to the user for selection (e.g., in a list box or as individual buttons). Alternatively, the user manually adds the appropriate logical operators to the selected elements.

Figure 4A:
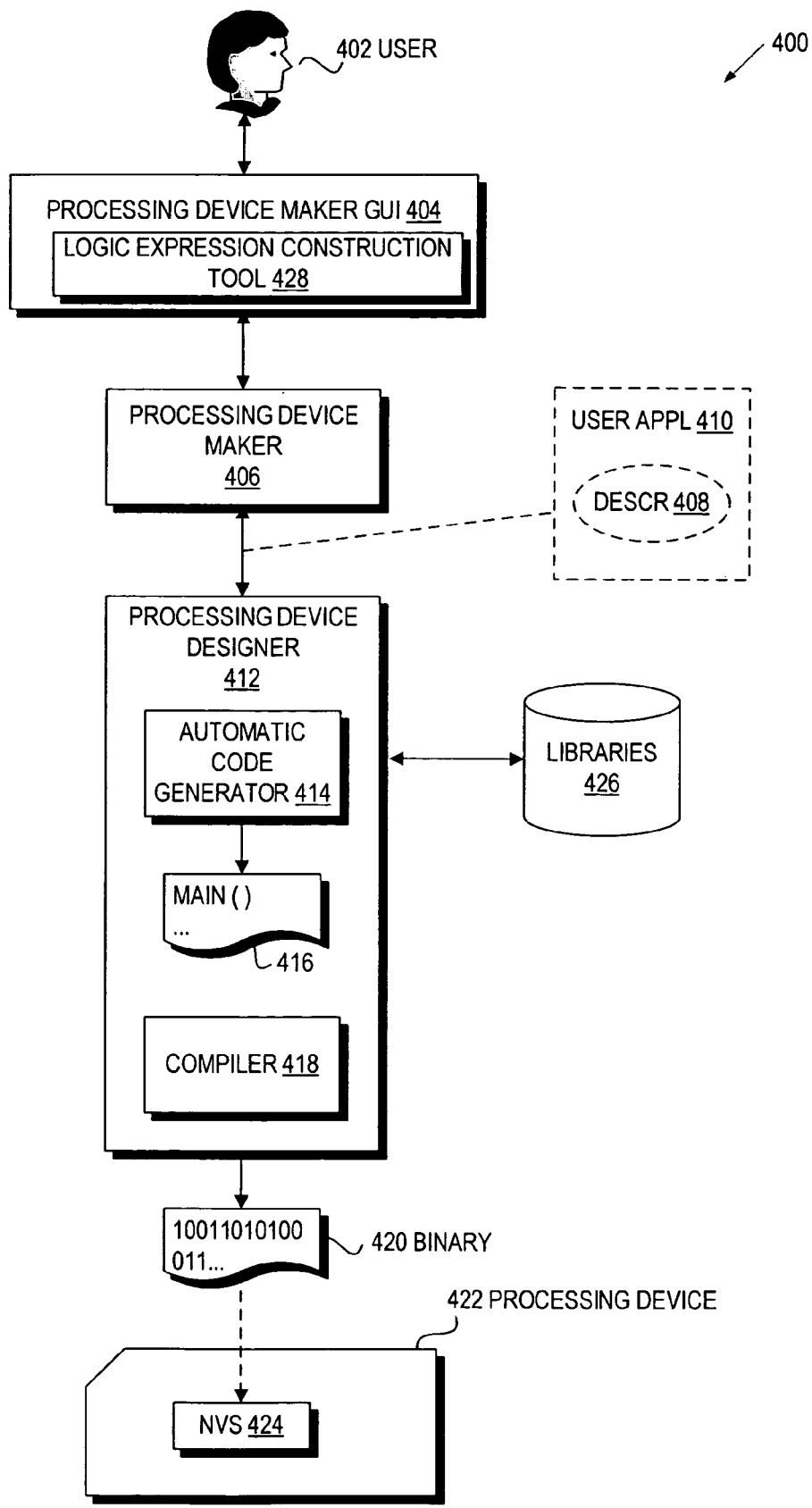
FIG. 4A illustrates one embodiment of a system for constructing a user application for implementation on a processing device.

In one embodiment, the logic expression construction tool 100 is part of a process for constructing a user application for implementation on a processing device. FIG. 4A illustrates an exemplary system 400 for constructing a user application for implementation on a processing device. The processing device may include one or more general-purpose processing devices, such as a microprocessor or central processing unit, a network processor, a microcontroller, an embedded Programmable Logic Device (PLD), etc. Alternatively, the processing device may include one or more special-purpose processing devices, such as a Digital Signal Processor (DSP), an Application Specific Integrated Circuit (ASIC), a Field Programmable Gate Array (FPGA), or the like. The processing device may also include any combination of a general-purpose processing device and a special-purpose processing device.

The system 400 includes a processing device maker 406 that is responsible for constructing a user application 410 for implementation on a processing device 422. The user application 410 may be described in a user application description 408. In one embodiment, the user application description 408 is a text file that describes the user's application 410.

In one embodiment, the processing device maker 106 provides a processing device maker graphical user interface (GUI) 404 that allows a user 402 to select input and output (I/O) devices for the design of the application 410. The GUI 404 provides a logic expression construction tool 428 that facilitates the construction of logic expressions such as transfer functions for the application 410. A transfer function specifies user-controlled logic for defining the behavior of the application 410. In particular, a transfer function may define the relationships between input and output devices selected for the application 410. Exemplary UIs will be discussed in more detail below in conjunction with FIG. 5.

After the user completes the design of the application 410, the user may perform a simulation of the user application 410. The simulation capability enables hardware independence by verifying the application behavior without requiring the user to compile and debug the firmware on the targeted processing device. Simulation also includes the ability to create complex input files to exhaustively test the application behavior with arbitrarily large combinations of input values. The simulation logs the outputs based on the application behavior so that the results may be analyzed by the user.

Next, the user may request that processing device code be automatically generated. The user does not have to perform any actual coding. In one embodiment, after the user selects the targeted processing device 422, the user application description 408 is handed-off to a processing device designer 412 for the generation of processing device code. The processing device designer 412 may include an automatic code generator 414 that assembles the code for the user's application 410 based on the user application description 408. The automatic code generator 414 generates processing device code 416 (e.g., high-level language code, such as C, low-level code, such as Assembly, or a combination thereof).

A compiler 418 compiles the code 416 to generate a binary 420, also known as a binary image or a Read-Only Memory (ROM) image. The binary 420 is loaded into a Non-Volatile Storage (NVS) 424 of the processing device 422. In one embodiment, NVS 424 includes flash memory.

In one embodiment, the code 416 is constructed from pre-built and pre-tested code libraries to eliminate time wasted on debugging, such as finding syntax errors. In addition, in one embodiment, the user is allowed to generate the user application 410 without referencing a targeted processing device. Instead of choosing a processing device to implement a user application and then writing code for that processing device, embodiments of the present invention allow a user application to be created and then code automatically generated for a particular processing device. Moreover, a user may take a user application, make revisions to the user application, and quickly generate revised programming device code.

As discussed above, the processing device maker GUI 404 allows the user to select I/O devices for the user application 410. In one embodiment, the processing device maker GUI 404 uses device drivers that represent I/O and interface devices to the user. Generally, a device driver is a building block used in the construction of the user application 410. In one embodiment, a device driver maps onto a channel that provides an adaptation layer between the device driver and processing device peripherals. A channel represents resource needs of a hardware function associated with a corresponding device driver. Subsequently, when the user requests to generate processing device code for the user application 410, the processing device maker GUI 404 allows the user to select a desired processing device (targeted processing device 422). In one embodiment, the processing device maker 406 finds applicable processing devices using predefined application projects (also referred to herein as base projects). A base project describes hardware components (e.g., blocks, pins, etc.) of a specific processing device.

Figure 4B:
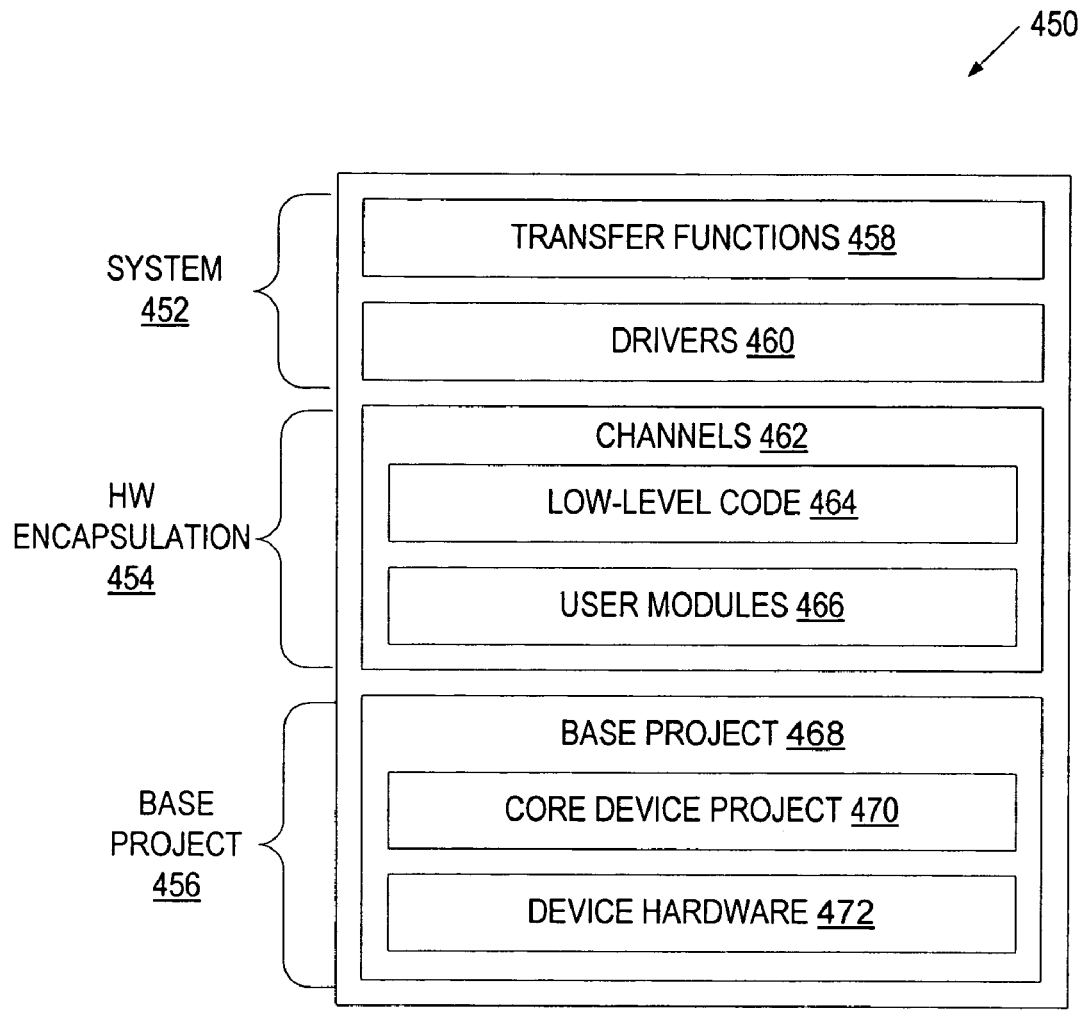
FIG. 4B illustrates a firmware stack model in accordance with one embodiment of the invention.

FIG. 4B illustrates a firmware stack model 450 in accordance with one embodiment of the invention. Firmware stack 450 shows a logical structure of at least a portion of the processing device code 416. A portion of the stack 450 is abstracted away from specific hardware. Such hardware independency provides the automatic code generator 414 with a consistent architecture for stitching together various code blocks.

Firmware stack 450 includes a system layer 452, a hardware encapsulation layer 454, and a base project layer 456. The functionality of the system layer 452 is independent of the targeted processing device. Also, interfaces, such as Application Program Interfaces (APIs), made between system layer 452 and the remaining layers of firmware stack 450 are standardized regardless of the targeted processing device. The term "standardized" refers to the hardware independence of the APIs. This abstraction away from specific hardware allows system layer 452 to function without regard to the particular hardware. The low layers of firmware stack 450 have "knowledge" of the specific hardware and take care of the implementation details for the system layer 452.

The hardware encapsulation layer 454 and the base project layer 456 are generated based at least in part on the targeted processing device. Hardware encapsulation layer 454 represents the underlying hardware to system layer 452. Base project layer 456 includes a set of standard functions associated with the targeted processing device hardware. Base project layer 456 may include functionality at the register level of the targeted processing device.

System layer 452 may include transfer functions 458 and drivers 460. System layer 452 is targeted by an application level mapping function. Transfer functions 458 invoke the transfer functions defined by the user. The transfer functions are the highest level of the code. They have no knowledge about any hardware. They only know about variables set by a driver or used to set the output of a driver.

Drivers 460 represent I/O and interface devices to the user. In one embodiment, drivers 460 may include three types: input, output, or interface. An output driver may be used with a device that is controlled by the user application, such as a fan or heater. Input drivers may be used for sensors, such as temperature or voltage sensors. Interface drivers may be used for devices that allow access to system variables and status, such as an Inter-Integrated Circuit (I2C) or a Serial Peripheral Interface (SPI).

Transfer functions 458 and drivers 460 may communicate with each other using APIs. Examples of APIs may include DriverName-Instantiate to initialize a device, DriverName_Get Value to return a value from an input device, and DriverName_Set Value to set an output of an output device to a specific value. These APIs are defined such that they may be invoked regardless of the particular hardware.

Drivers 460 communicate with hardware encapsulation layer 454 that include channels 462. Drivers include driver metadata and source code templates. In one embodiment, drivers 462 contain source code that converts channel information to a higher-level meaning. For example, the LM20 driver converts low-level voltage measured by the mVolts channel and converts it to its respective temperature value.

Channels 462 are hardware independent and are usually defined to provide a generic resource. These generic resources may be, for example, voltage measurements, PWM (pulse-width modulation) outputs, general purpose I/O, etc. Channels 462 provide a platform for drivers 460 and dictate the interface between the base project layer 456 and drivers 460.

The base project layer 456 includes a base project 468 associated with a specific processing device such as the targeted processing device 422. The base project 468 includes a core device project 470 that describes unique configuration characteristics of the processing device (e.g., pin configuration that can be applied to the processing device), and processing device hardware 472.

FIGS. 5A-5G illustrate exemplary UIs facilitating the construction of a transfer function.

Figure 5A:
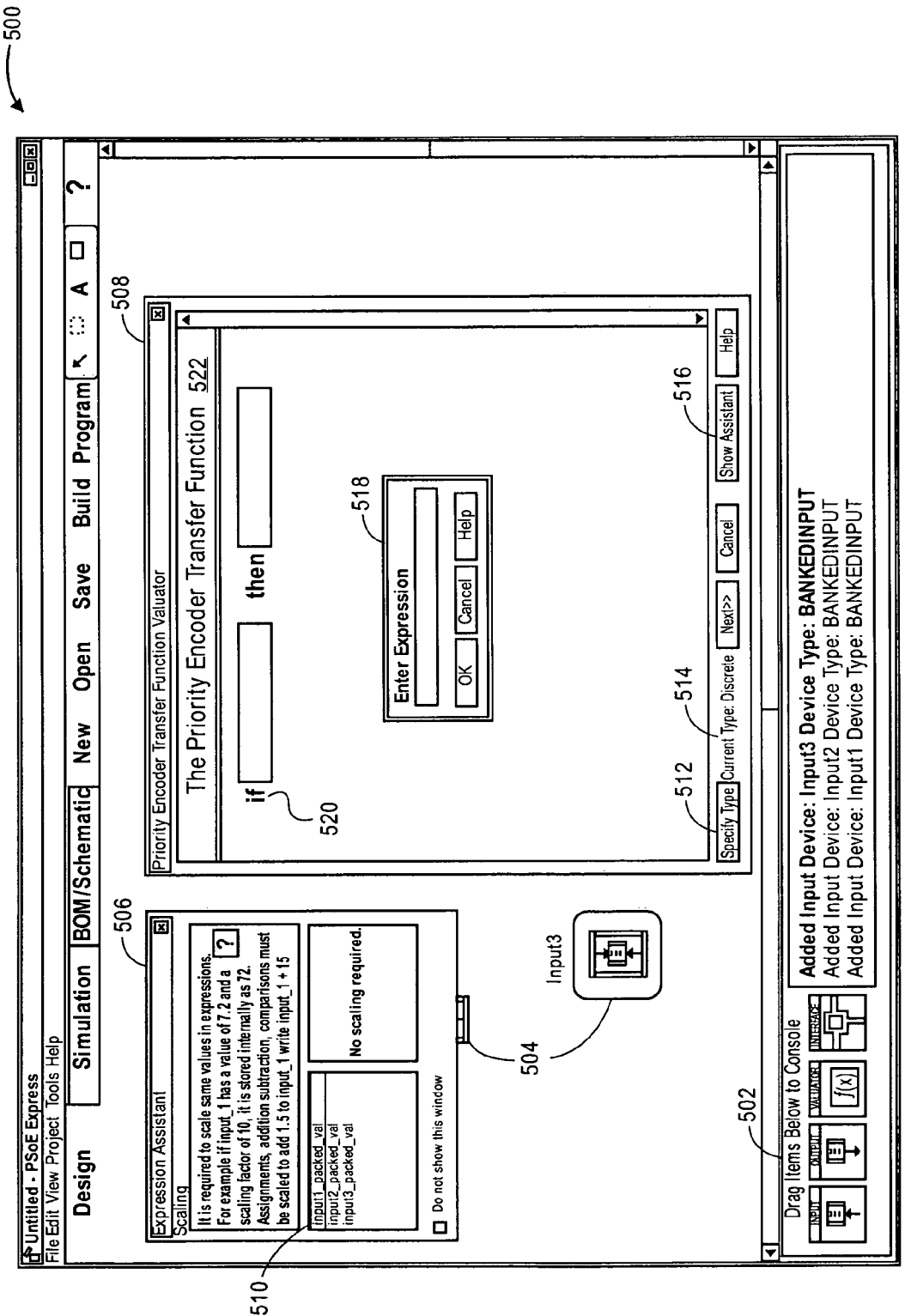
FIGS. 5A-5G illustrate exemplary UIs facilitating the construction of a transfer function.

Referring to FIG. 5A, a UI 500 includes tabs for various stages in designing the user application at the top of the screen. These tabs include Design, Simulation, and Bill of Materials/Schematic (BOM/Schem). The Design tab may be used for designing the user application. The Simulation tab provides a software simulation of the user's application. The BOM/Schem tab is used to generate a bill of materials, schematic and/or a datasheet for the user's application. The UI 500 may also include a Build button that invokes the automated code functionality to automatically generate code for the user application without requiring the user to write any code.

The UI 500 also includes a tray area 502. The user uses the tray 502 to select desired objects such as inputs, outputs and valuators, and drag them to the workspace area. In the example of FIG. 5A, the user has dragged 3 input devices 504. In one embodiment, when the user selects a device, a corresponding driver type is identified, and a driver instance is created for the design.

The UI 500 further includes a transfer function window 508 to build a transfer function 522 specified by the user and an expression assistant window 506 to present a list of possible transfer function elements 510. The possible elements 510 include valid names of driver states. In one embodiment, the possible elements also include values or value ranges for comparison with driver states.

The transfer function window 508 includes several buttons such as the "Specify Type" button 512 that allows the user to specify the desired valuator type and other associated valuator characteristics. The currently designated type is displayed as item 514. The "Show Assistant" button 516 allows the user to request that the window 506 appear on the screen. The transfer function window 508 also includes transfer function logic fields 520 and a pop-up window (Expression Editor window) 518 with the "Enter expression" box.

Figure 5B:
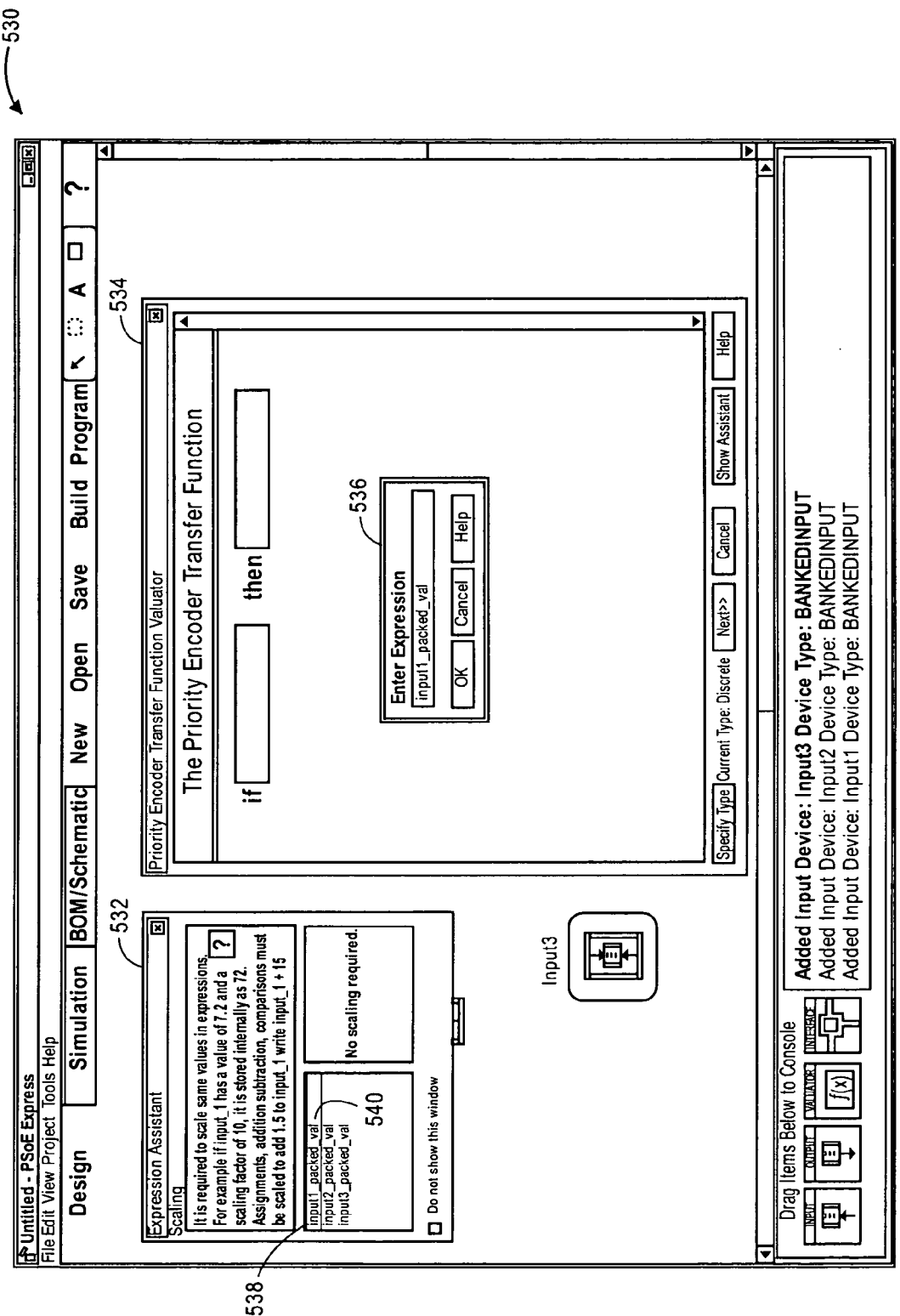

Referring to FIG. 5B, a UI 530 illustrates the user's selection of an input driver state 540 from the list of valid driver state names 538 displayed in the window 532. Once the user makes the selection (e.g., by double-clicking the entry 540 in the list 538), the name of the selected driver state appears in the pop-up window 536 within the window 534.

Figure 5C:
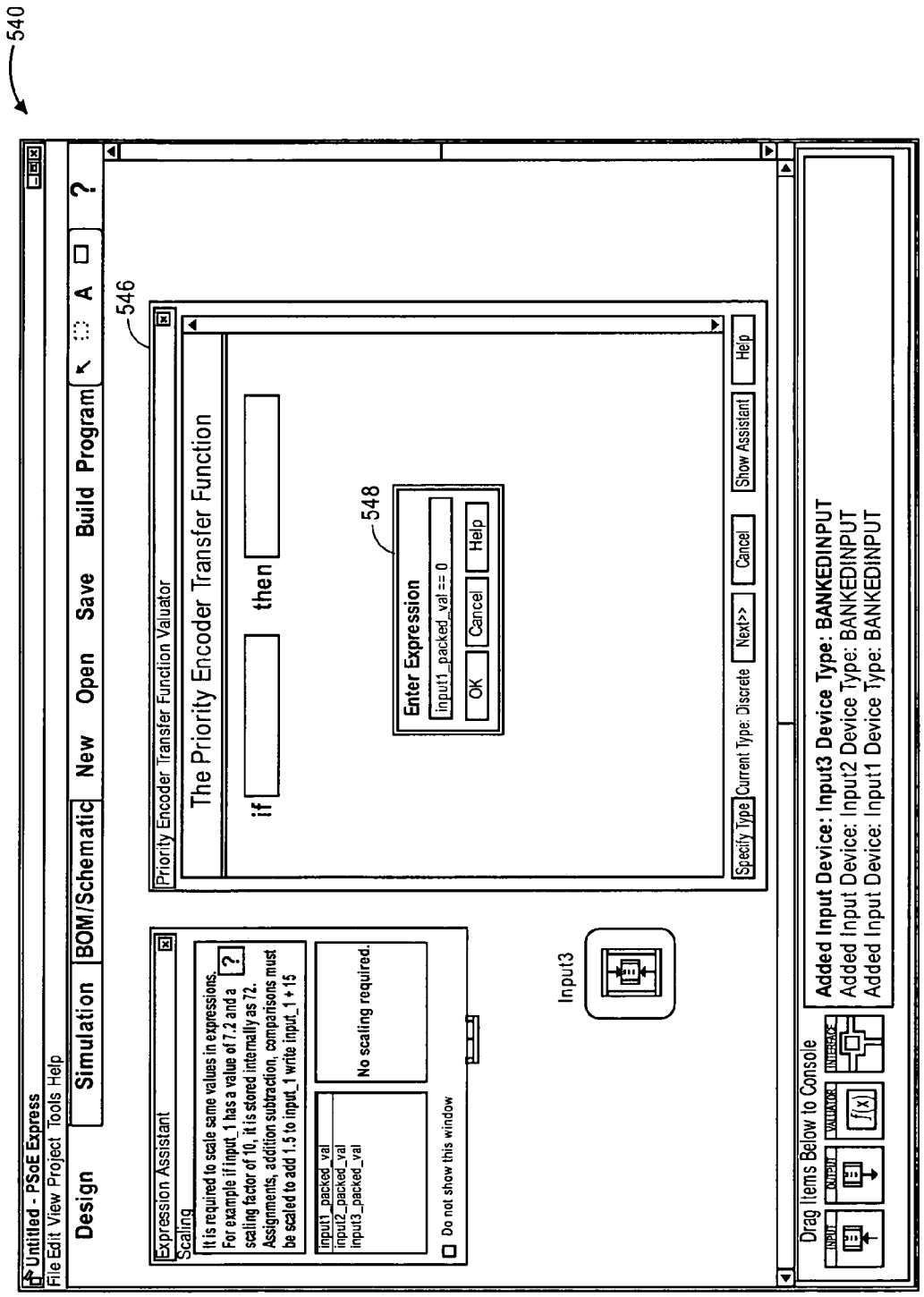

Referring to FIG. 5C, a UI 540 includes window 546 containing a pop-up window 548 displaying the selected driver state name, as well as additional data entered by the user such as a logical operator ("==") and a comparison value ("0"). If the expression is complete, the user can click the OK button in the pop-up window 548.

Figure 5D:
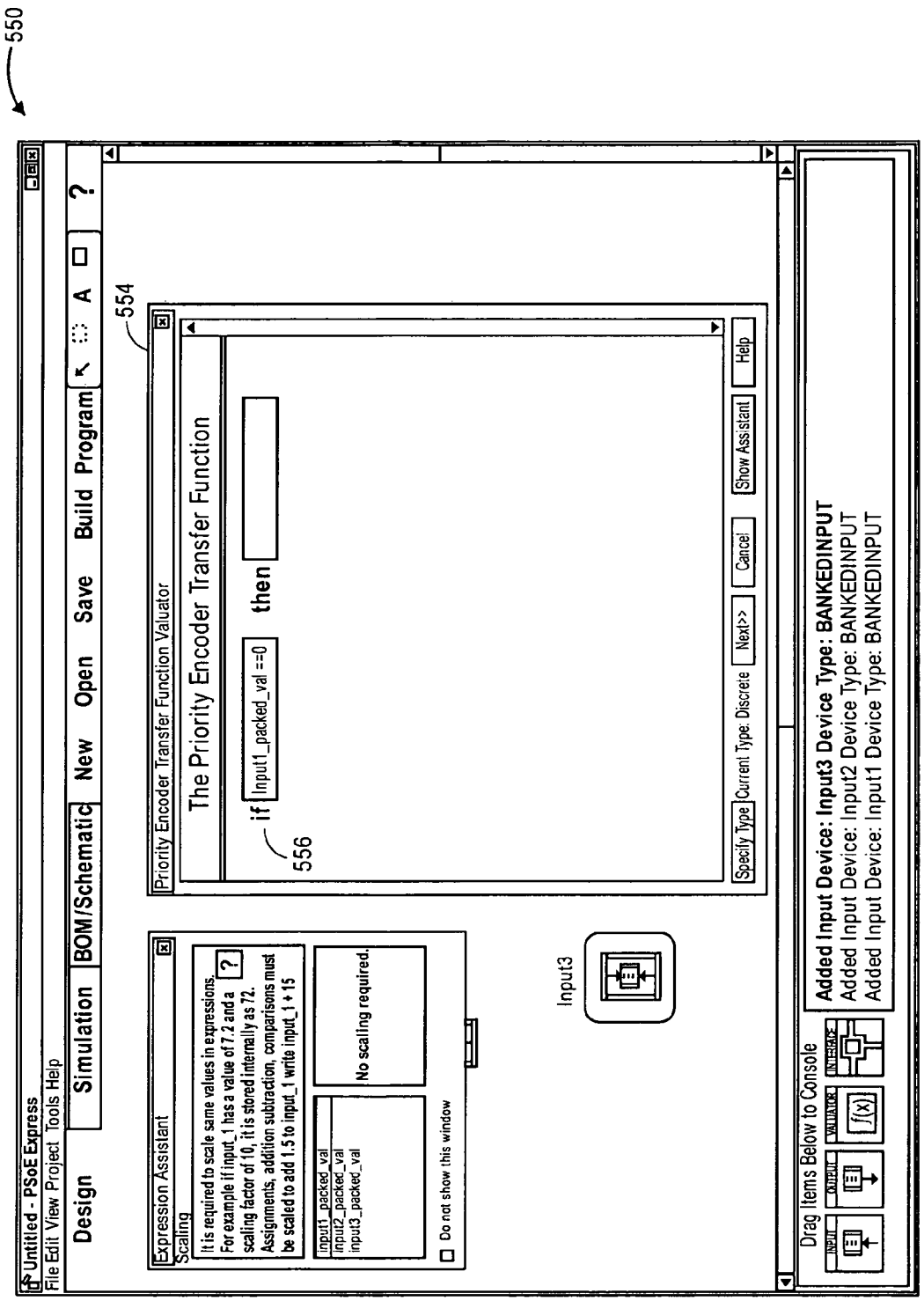

Referring to FIG. 5D, a UI 550 is generated in response to the user activation of the OK button in the UI 540. In particular, as shown in the UI 550, the popup-window containing the expression has disappeared and its content becomes visible in the transfer function logic field 556 of window 554.

Figure 5E:
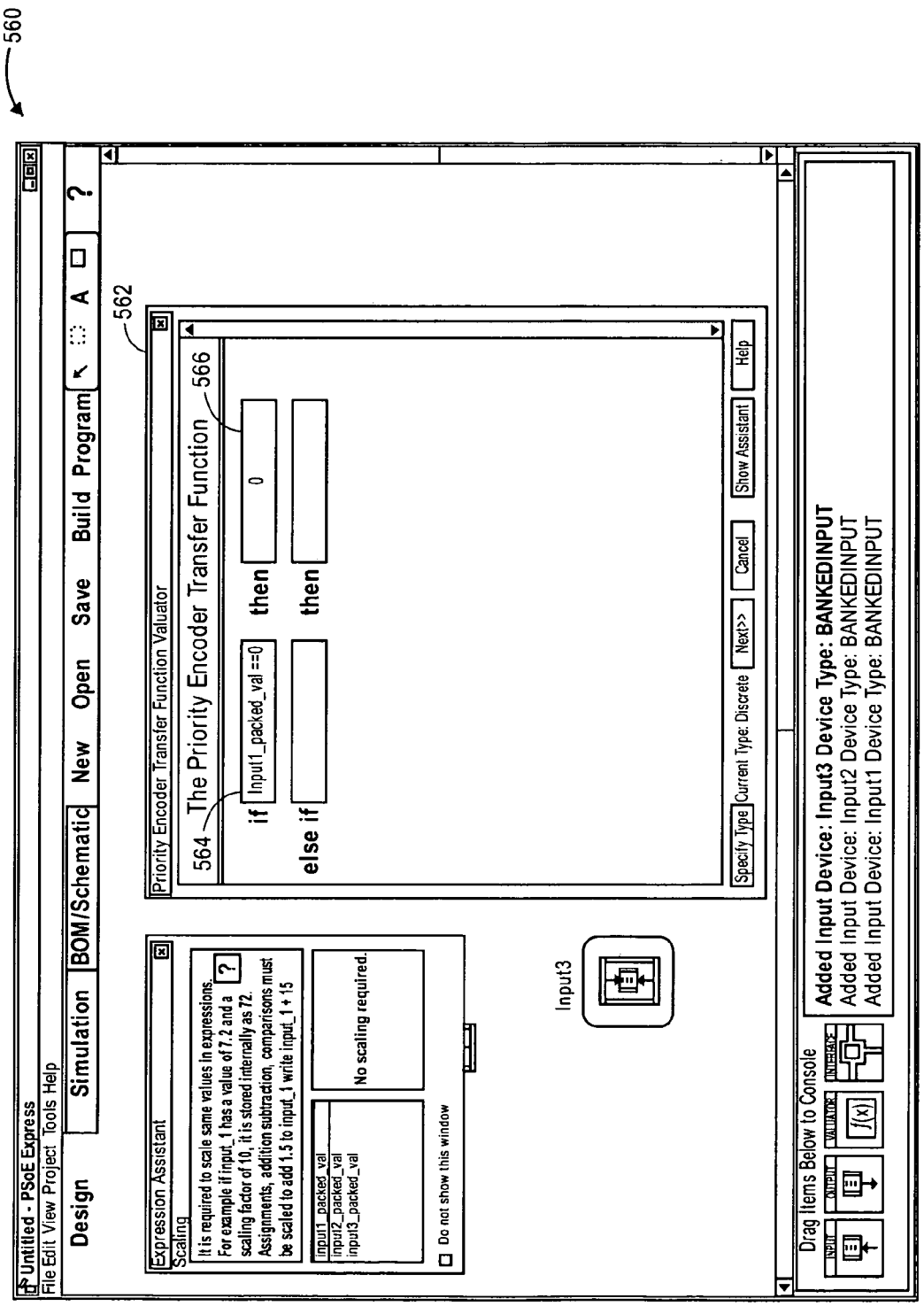

Referring to FIG. 5E, a UI 560 shows window 562 containing logic fields 564 and 566 that define the desired logic for the transfer function.

Figure 5F:
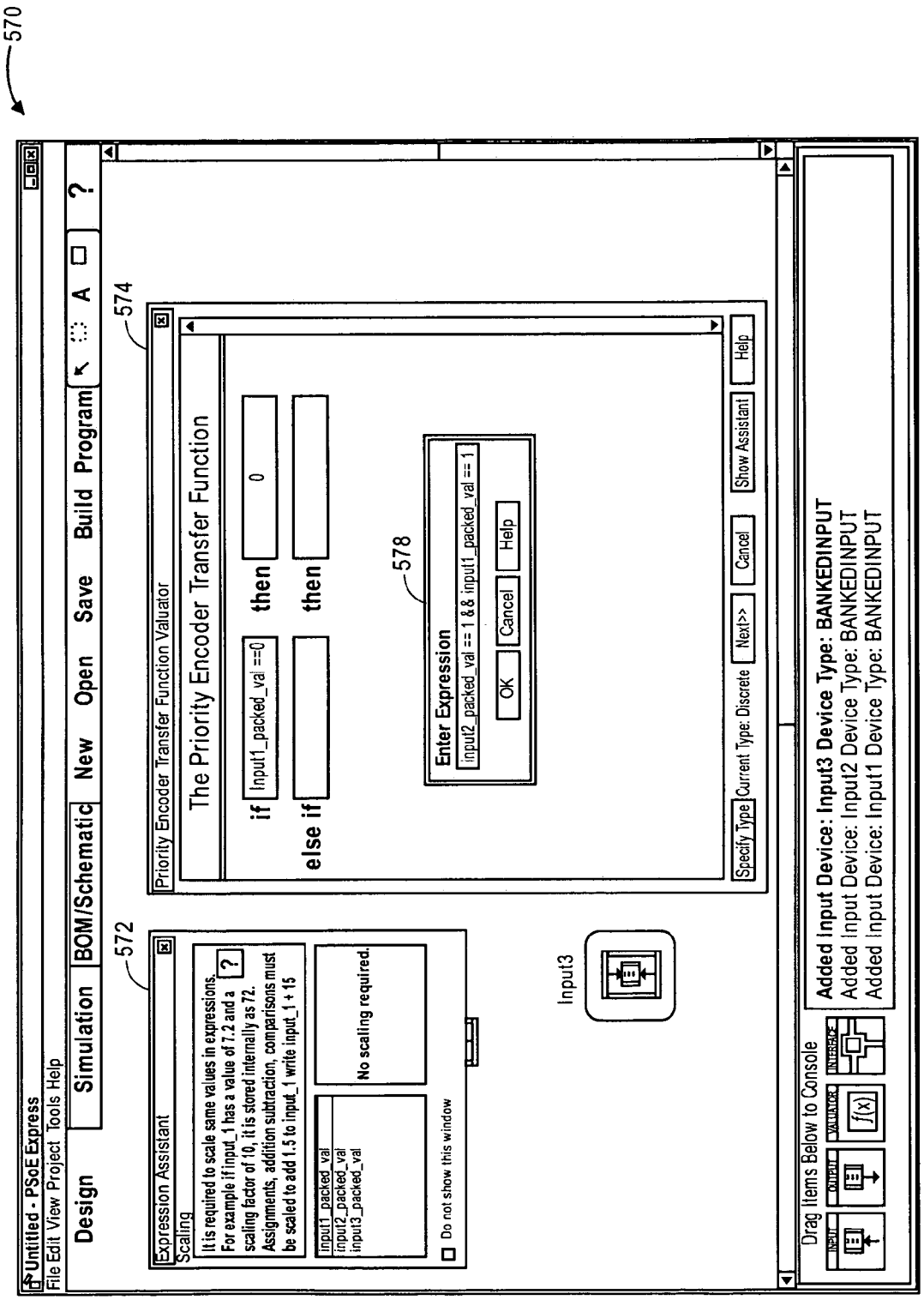

Referring to FIG. 5F, a UI 570 illustrates the user selection of two driver state names 576 from the list displayed in the window 572. The selected names appear in the popup window 578. The popup window 578 also shows logic operators and comparison values specified by the user. Once the user activates the OK button in the pop-up window 578, the pop-up window 578 disappears, and its content becomes visible in the transfer function logic fields.

Figure 5G:
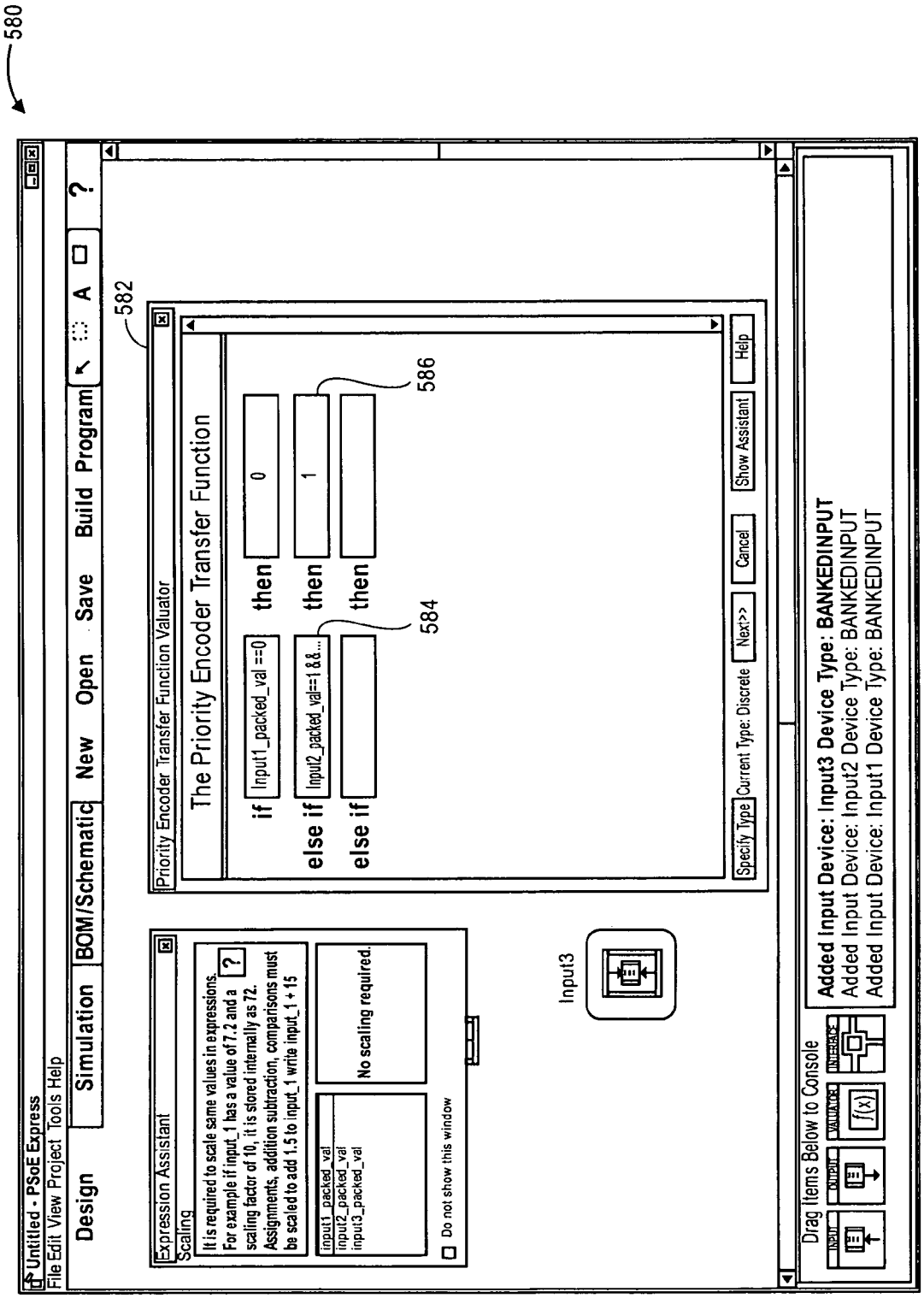

FIG. 5G illustrates a UI 580 containing window 582 that displays the next branch of the transfer function logic in fields 584 and 586.

Figure 6:
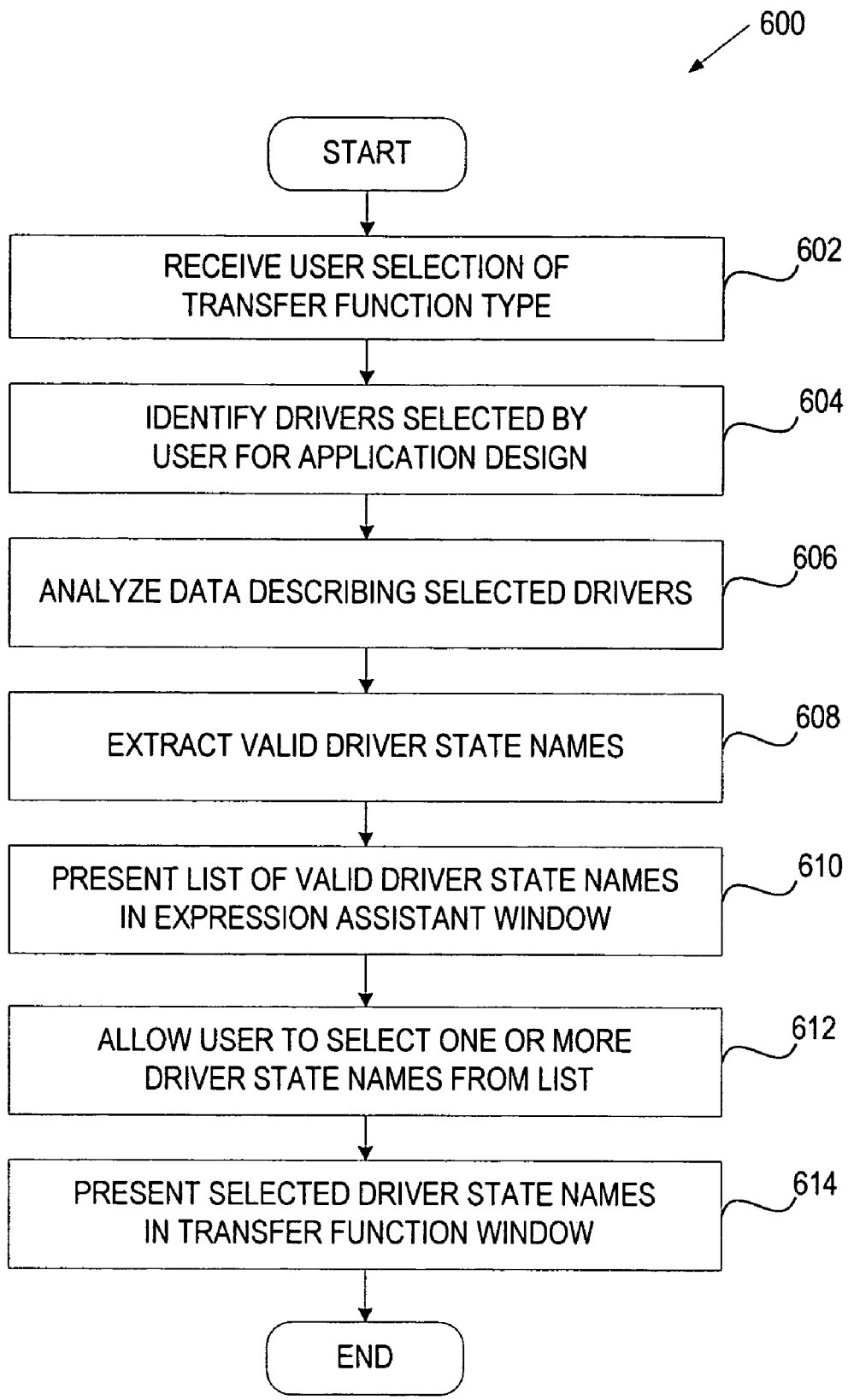
FIG. 6 is a flow diagram of one embodiment of a method for facilitating the construction of a transfer function.

FIG. 6 is a flow diagram of one embodiment of a method 300 for facilitating the construction of a transfer function. The method 600 may be performed by processing logic of the logic expression construction tool 428. Processing logic may comprise hardware (e.g., circuitry, dedicated logic, programmable logic, microcode, etc.), software (such as run on a general purpose computer system or a dedicated machine), or a combination of both.

Referring to FIG. 6, method 600 begins with processing logic receiving a user-specified name or type of a transfer function (block 602). In one embodiment, a UI is provided that allows the user to specify the name or type of the transfer function (e.g., by selecting it from a relevant list).

At block 604, processing logic identifies drivers selected by the user for the application design.

In response, processing logic dynamically (as soon as the drivers are selected) generates a list of possible transfer function elements. In particular, at block 606, processing logic analyzes driver data (e.g., XML metadata) describing the selected drivers. At block 608, processing logic extracts valid driver state names from the driver data. In one embodiment, the drivers selected by the user have a hierarchical relationship. For these hierarchical drivers, processing logic builds a tree with intermediate nodes representing drivers and leaf nodes representing driver states defined by the user. Processing logic then compiles a list of possible transfer logic elements that includes valid driver state names determined using the tree data. In one embodiment, the list also includes names of values and/or value ranges to be used for comparison with the driver states. Alternatively, the comparison values and/or value ranges are not included in the list.

At block 610, processing logic presents to the user the list of possible transfer function elements. In one embodiment, the list of possible elements is displayed in a separate window on the screen (e.g., Express Assistant window). This window may have an established dynamic connection with the currently active Expression Editor window.

At block 612, processing logic allows the user to select one or more elements from the list. The user can make a selection by clicking or double-clicking the desired element(s) or copying and pasting the desired element(s) in the list. The user may be able to select several elements at once or one element at a time.

At block 614, processing logic presents the selected elements in the Expression Editor window.

The dynamic generation and presentation of the names of transfer function elements to the user reduces the possibility of user errors and eliminates the necessity of the user's prior knowledge of the structure of the selected drivers and the names of their states.

Figure 7:
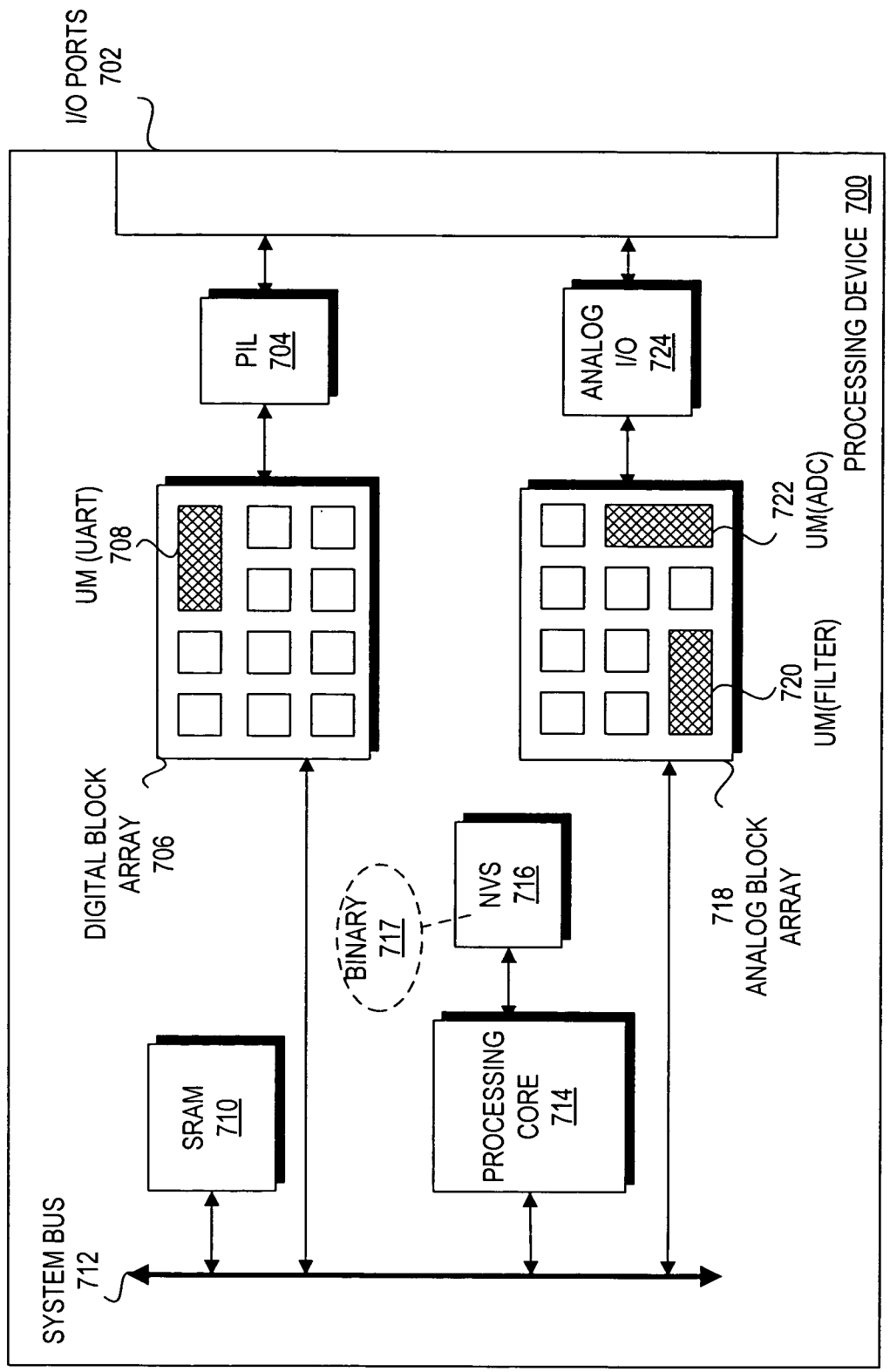
FIG. 7 is a block diagram of one embodiment of a processing device.

Turning to FIG. 7, an embodiment of a processing device 700 is shown. Processing device 700 includes a microcontroller. Processing device 700 includes Input/Output (I/O) ports 702. In one embodiment, I/O ports 702 are programmable. I/O ports 702 are coupled to a Programmable Interconnect and Logic (PIL) 704 which is coupled to a digital block array 706. In FIG. 7, digital block array 706 includes a UM 708 that has been configured as a Universal Asynchronous Receive/Transmitter (UART). Digital block array 706 is coupled to a system bus 712.

A Static Random Access Memory (SRAM) 710 and a processing core 714 are also coupled to system bus 712. Processing core 714 is coupled to NVS 716 which has stored a binary 717. In one embodiment, binary 717 includes instructions generated as described herein. In another embodiment, binary 717 may include instructions executable by processing core 714 as well as instructions for configuring block arrays 716 and 718.

Analog block array 718 is coupled to system bus 712. In the embodiment of FIG. 7, analog block array 718 includes a UM 720 configured as a filter and a UM 722 configured as an ADC. Analog block array 718 is also coupled to an analog I/O unit 724 which is coupled to I/O ports 702. Processing device 700 may also include other components, not shown for clarity, including a clock generator, an interrupt controller, an I2C, or the like.

FIG. 11 illustrates an exemplary computer system 800 on which embodiments of the present invention may be implemented. Computer system 800 includes a processor 802 and a memory 804 coupled to a chipset 806. Storage 812, Non-Volatile Storage (NVS) 805, network interface (I/F) 814, and Input/Output (I/O) ports 818 may also be coupled to chipset 806. Embodiments of computer system 800 include, but are not limited to, a desktop computer, a notebook computer, a server, a personal digital assistant, a network workstation, or the like. In one embodiment, processor 802 executes instructions stored in memory 804.

Memory 804 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like.

Chipset 806 may include a memory controller and an input/output controller. Chipset 806 may also include system clock support, power management support, audio support, graphics support, or the like. In one embodiment, chipset 806 is coupled to a board that includes sockets for processor 802 and memory 804.

Components of computer system 800 may be connected by various interconnects. Such interconnects may include a Peripheral Component Interconnect (PCI), a System Management bus (SMBUS), a Low Pin Count (LPC) bus, a Serial Peripheral Interface (SPI) bus, an Accelerated Graphics Port (AGP) interface, or the like.

I/O ports 816 may include ports for a keyboard, a mouse, a display, a printer, a scanner, or the like. Embodiments of I/O ports 816 include a Universal Serial Bus port, a Firewire port, a Video Graphics Array (VGA) port, a Personal System/2 (PS/2) port, or the like.

Processing device 422 may be coupled to computer system 800 via I/O ports 816. Computer system 800 may have stored computer-readable instructions, in accordance with embodiments described herein, to allow a user to design the application 410 using UIs described herein and automatically generate processing device code for processing device 422 using computer system 800. This code may be compiled into a binary and loaded into NVS 424.

Figure 8:
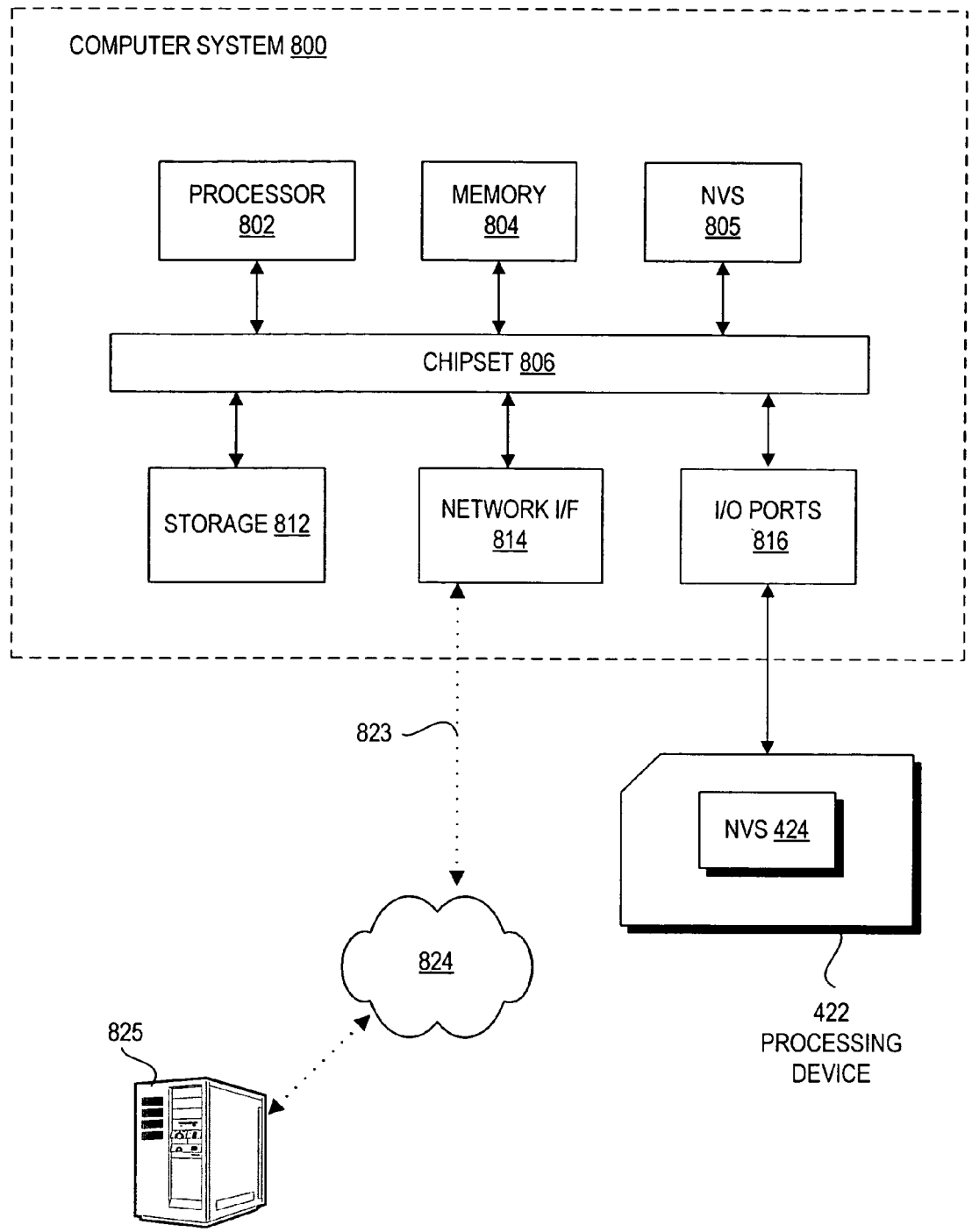
FIG. 8 is a block diagram of one embodiment of a computer system.

Computer system 800 may interface to external systems through network interface 814. Network interface 814 may include, but is not limited to, a modem, a Network Interface Card (NIC), or other interfaces for coupling a computer system to other computer systems. A carrier wave signal 823 may be received/transmitted by network interface 814. In the embodiment illustrated in FIG. 8, carrier wave signal 823 is used to interface computer system 800 with a network 824, such as a Local Area Network (LAN), a Wide Area Network (WAN), the Internet, or any combination thereof. In one embodiment, network 824 is further coupled to a computer system 825 such that computer system 800 and computer system 825 may communicate over network 814.

Computer system 800 also includes non-volatile storage 805 on which firmware and/or data may be stored. Non-volatile storage devices include, but are not limited to, Read-Only Memory (ROM), Flash memory, Erasable Programmable Read Only Memory (EPROM), Electronically Erasable Programmable Read Only Memory (EEPROM), Non-Volatile Random Access Memory (NVRAM), or the like. Storage 812 includes, but is not limited to, a magnetic disk drive, a magnetic tape drive, an optical disk drive, or the like. It is appreciated that instructions executable by processor 802 may reside in storage 812, memory 804, non-volatile storage 805, or may be transmitted or received via network interface 814.

For the purposes of the specification, a machine-readable medium includes any mechanism that provides (i.e., stores and/or transmits) information in a form readable or accessible by a machine (e.g., a computer, network device, personal digital assistant, manufacturing tool, any device with a set of one or more processors, etc.). For example, a machine-readable medium includes, but is not limited to, recordable/non-recordable media (e.g., Read-Only Memory (ROM), Random Access Memory (RAM), magnetic disk storage media, optical storage media, a flash memory device, etc.). In addition, a machine-readable medium may include propagated signals such as electrical, optical, acoustical or other forms of propagated signals (e.g., carrier waves, infrared signals, digital signals, etc.).

Various operations of embodiments of the present invention are described herein. These operations may be implemented by a machine using a processor, an Application Specific Integrated Circuit (ASIC), a Field Programmable Gate Array (FPGA), or the like. In one embodiment, one or more of the operations described may constitute instructions stored on a machine-readable medium, that when executed by a machine will cause the machine to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of illustrated embodiments of the invention, including what is described in the Abstract, is not intended to be exhaustive or to limit the embodiments to the precise forms disclosed. While specific embodiments of, and examples for, the invention are described herein for illustrative purposes, various equivalent modifications are possible, as those skilled in the relevant art will recognize. These modifications can be made to embodiments of the invention in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A method, comprising:
   generating a list of possible elements of logic expression from a user-specified type of logic expression;
   presenting to a user the list of possible elements for a logic expression, the possible elements comprising one or more names of variables;
   receiving a user selection of one or more elements from the list of possible elements;
   presenting the selected elements as part of the logic expression; and
   allowing the user to complete the logic expression using the selected elements and at least one logical operator.

2. The method of claim 1 wherein the user has no prior knowledge of the names of variables presented in the list.

3. The method of claim 1 wherein the possible elements further comprise one or more names of values for the variables.

4. The method of claim 1 further comprising:
   receiving a user selection of the at least one logical operator.

5. The method of claim 1 wherein:
   the list of possible elements is presented in an expression assistant window on a screen; and
   the selected elements are presented as part of the logic expression in an expression window on the screen.

6. The method of claim 1 wherein the user selection of one or more elements is received when the user double-clicks on the one or more elements.

7. The method of claim 1 wherein the user selection of the one or more elements is received when the user copies the one or more elements and pastes the one or more elements into an expression window.

8. The method of claim 1 wherein:
   the variables are states of drivers selected by the user for a design of an application; and
   the logic expression pertains to a transfer function defining behavior of the application.

9. The method of claim 8 wherein dynamically generating the list of possible elements comprises:
  analyzing data describing the selected drivers; and
  extracting names of driver states from the data describing the selected drivers.

10. The method of claim 9 further comprising:
  building a tree for the selected drivers having a hierarchical relationship; and
  adding names of states specified by the user for the selected drivers.

11. An article of manufacture comprising:
  a machine-readable medium including a plurality of instructions which when executed perform a method comprising:
  generating a list of possible elements of logic expression from a user-specified type of logic expression;
  presenting to a user a list of possible elements for a logic expression, the possible elements comprising one or more names of variables;
  receiving a user selection of one or more elements from the list of possible elements;
  presenting the selected elements as part of the logic expression; and
  allowing the user to complete the logic expression using the selected elements and at least one logical operator.

12. The article of manufacture of claim 11 wherein the possible elements further comprise one or more names of values for the variables.

13. The article of manufacture of claim 11 wherein the method further comprises:
  receiving a user selection of the at least one logical operator.

14. The article of manufacture of claim 11 wherein:
  the list of possible elements is presented in an expression assistant window on a screen; and
  the selected elements are presented as part of the logic expression in an expression window on the screen.

15. The article of manufacture of claim 11 wherein the user selection of one or more elements is received when the user double-clicks on the one or more elements.

16. The article of manufacture of claim 11 wherein the user selection of the one or more elements is received when the user copies the one or more elements and pastes the one or more elements into an expression window.

17. An apparatus comprising:
  an expression component generator to generate a list of possible elements of logic expression from a user-specified type of logic expression;
  an expression assistant module to present to a user the list of possible elements for a logic expression, the possible elements comprising one or more names of variables; and
  an expression composition module to receive a user selection of one or more elements from the list of possible elements, to present the selected elements as part of the logic expression, and to allow the user to complete the logic expression using the selected elements and at least one logical operator.

18. The apparatus of claim 17 wherein:
  the variables are states of drivers selected by the user for a design of an application;
  the logic expression pertains to a transfer function defining behavior of the application; and
  the expression component generator is to dynamically generate the list of possible elements by analyzing data describing the selected drivers, and extracting names of driver states from the data describing the selected drivers.

19. The apparatus of claim 18 wherein the expression generator is further to build tree for the selected drivers having a hierarchical relationship, and to add names of states specified by the user for the selected drivers.

* * * * *